(12) United States Patent
Fu et al.

(10) Patent No.: US 11,755,168 B2
(45) Date of Patent: Sep. 12, 2023

(54) INFRARED TOUCH DISPLAY SCREEN

(71) Applicant: SHENZHEN HITEVISION TECHNOLOGY CO., LTD., Guangdong (CN)

(72) Inventors: Tao Fu, Guangdong (CN); Xukai Wang, Guangdong (CN); Qingsong Yin, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 34 days.

(21) Appl. No.: 17/630,174

(22) PCT Filed: Jul. 24, 2020

(86) PCT No.: PCT/CN2020/104514
§ 371 (c)(1),
(2) Date: Jan. 26, 2022

(87) PCT Pub. No.: WO2021/018043
PCT Pub. Date: Feb. 4, 2021

(65) Prior Publication Data
US 2022/0276734 A1 Sep. 1, 2022

(30) Foreign Application Priority Data
Jul. 26, 2019 (CN) .......................... 201921198144.7

(51) Int. Cl.
G06F 3/046 (2006.01)
G06F 3/041 (2006.01)

(52) U.S. Cl.
CPC ............ G06F 3/046 (2013.01); G06F 3/0412 (2013.01)

(58) Field of Classification Search
CPC ............................. G06F 3/046; G06F 3/0412
See application file for complete search history.

(56) References Cited

U.S. PATENT DOCUMENTS

| 4,751,379 A | 6/1988 | Sasaki et al. | |
| 2015/0035799 A1* | 2/2015 | Lin | G06F 3/0421 |
| | | | 345/175 |

FOREIGN PATENT DOCUMENTS

| CN | 104391611 A | 3/2015 |
| CN | 206921065 U | 1/2018 |

(Continued)

OTHER PUBLICATIONS

The International search report for PCT Application No. PCT/CN2020/104514, dated Oct. 28, 2020, 9 pages.

(Continued)

Primary Examiner — Lisa S Landis
(74) Attorney, Agent, or Firm — East IP P.C.

(57) ABSTRACT

The present application provides an infrared touch display screen, including a frame, a display panel assembly, a light-filter strip and a circuit board assembly. The display panel assembly includes a protective layer, the circuit board assembly includes a circuit board and infrared lamp tubes arranged on the circuit board, the frame includes a first portion for mounting the light-filter strip and a second portion for mounting the circuit board assembly, the first portion is located at a front side of the protective layer, the second portion is located outside the protective layer and the first portion; the circuit board corresponds to a position of the protective layer in a front-back direction, the infrared lamp tubes correspond to a position of the light-filter strip in the front-back direction, and an extending direction of the infrared lamp tubes is parallel to the protective layer.

20 Claims, 2 Drawing Sheets

(56) References Cited

FOREIGN PATENT DOCUMENTS

| CN | 207833473 U |   | 9/2018 |
|----|-------------|---|--------|
| CN | 208044573 U | * | 11/2018 |
| CN | 208044573 U |   | 11/2018 |
| WO | 2018196282 A1 |  | 11/2018 |

OTHER PUBLICATIONS

The extended European search report for EP Application No. 20846250.7, dated Jun. 23, 2023, 10 pages.

* cited by examiner

INFRARED TOUCH DISPLAY SCREEN

CROSS REFERENCE TO RELATED APPLICATION

This application is a National Stage of International Application No. PCT/CN2020/104514, filed on Jul. 24, 2020, which claims priority to Chinese Patent Application No. 201921198144.7, filed on Jul. 26, 2019, both of which are hereby incorporated by reference in their entireties.

TECHNICAL FIELD

The present disclosure relates to the technical field of touch display devices, and in particular to an infrared touch display screen.

BACKGROUND

At present, a touch display screen generally uses infrared touch and fixes an infrared touch circuit board assembly and a light-filter strip to a frame. Due to the arrangement of the infrared touch circuit board assembly and the light-filter strip, the frame will inevitably be thicker. In a current mounting method, both a front side and a back side of the light-filter strip need to be fixedly connected to the frame, which causes a distance between the light-filter strip and the display screen to increase, so that a height of a touch region is basically greater than 3 mm, it means that when a touch object is 3 mm away from a front side face of the display screen, the touch will respond, which may be prone to the false touch and the poor touch experience. The infrared touch circuit board assembly includes a circuit board and infrared lamp tubes. In the current mounting method, in order to make the infrared lamp tubes closer to the display screen, the circuit board of the infrared touch circuit board assembly is arranged at the front side of the infrared lamp tubes. However, in this way, the distance from a front side of the frame to the front side of the display screen is generally greater than 7 mm. If a thickness of the frame is too large, an entire touch display device is too heavy, which affects the user's visual experience, and also causes a thickness of a cavity at the front side of the display screen of the current touch display screen to be thicker, so that it is not aesthetically pleasing.

SUMMARY

Due to the above situation, the main purpose of the present application is to provide an infrared touch display screen. The infrared touch display screen can effectively reduce the distance between a front side face of the frame and a front side face of a display screen assembly, and at the same time can reduce a distance between an axis of infrared lamp tubes and the front side face of the display screen assembly, so as to better avoid the accidental touch and have a more beautiful appearance, the touch experience and the visual experience can be improved.

To achieve the above object, the technical solution in the present application is as follows:

An embodiment of the present application provides an infrared touch display screen, including a frame, a display panel assembly, a light-filter strip and a circuit board assembly. The display panel assembly includes a protective layer, the circuit board assembly includes a circuit board and infrared lamp tubes arranged on the circuit board; the infrared lamp tubes are located at a front side of the circuit board; the protective layer is located in a space enclosed by the frame, the frame includes a first portion for mounting the light-filter strip and a second portion for mounting the circuit board assembly, the first portion is located at a front side of the protective layer, the second portion is located outside the protective layer and the first portion, the light-filter strip is located between the first portion and the protective layer, a front side of the light-filter strip is connected with the first portion, and a back side of the light-filter strip abuts against the protective layer; the circuit board corresponds to a position of the protective layer in a front-back direction, the infrared lamp tubes correspond to a position of the light-filter strip in the front-back direction, and an extending direction of the infrared lamp tubes is parallel to the protective layer.

Optionally, the first portion is provided with a first engaging groove; the first engaging groove is formed by concaving a back side face of the first portion toward a direction of a front side face of the first portion, a cross-section of the first engaging groove is configured as a trapezoid, a size of a side of the trapezoid close to the display panel assembly is smaller than a size of a side of the trapezoid away from the display panel assembly, the light-filter strip includes a first engaging portion engaged with the first engaging groove, a width of a free end of the first engaging portion is smaller than a width of an opposite end, and the light-filter strip is connected with the first portion through the first engaging portion snapping into the first engaging groove.

Optionally, the second portion is internally provided with a placement groove for placing the circuit board assembly, the second portion is also provided with a light outlet for emitting infrared light, the light outlet is located at an inward side of the placement groove and communicated with the placement groove, and the light-filter strip is located at an inward side of the light outlet and is arranged close to the light outlet.

Optionally, the placement groove includes a first groove wall facing the light outlet, a second engaging groove for mounting the circuit board assembly is arranged on the first groove wall, a second engaging portion engaged with the second engaging groove is arranged on the circuit board assembly, and the second engaging portion is inserted into the second engaging groove.

Optionally, a front side of the placement groove includes a second groove wall, and a first position-limiting portion protruding toward a direction of the circuit board assembly is arranged on the second groove wall to restrict the infrared lamp tubes from moving forward.

Optionally, a distance between a free end face of the first position-limiting portion and a front side face of the second portion is equal to a distance between a back side face of the first portion and a front side face of the first portion, and the first position-limiting portion is located at a position of head portions of the infrared lamp tubes.

Optionally, a second position-limiting portion is arranged at a side of the light outlet of the placement groove, the second position-limiting portion includes a stepped structure, the stepped structure includes a first stepped face, a second stepped face and a connecting face for connecting the first stepped face and the second stepped face, the first stepped face is located at a front side of the second stepped face, the circuit board assembly is provided with a third engaging portion engaged with the stepped structure, the second stepped face is configured to restrict the third engaging portion from moving toward a back side of the placement groove, and the connecting face is configured to restrict the third engaging portion from moving toward an inner side of the placement groove.

Optionally, a distance between an axis of the infrared lamp tubes and a front side face of the protective layer is less than or equal to 1.5 mm.

Optionally, a distance between a front side face of the frame and a front side face of the protective layer is less than or equal to 5.8 mm.

Optionally, the infrared touch display screen includes a corner structure, and the corner structure is located at a corner position of the frame to strengthen the connection strength of the corner position of the frame.

The embodiments of the present application provides the infrared touch display screen. The first portion is located at the front side of the protective layer, the light-filter strip is located between the first portion and the protective layer, the front side of the light-filter strip is connected with the first portion, and abuts against the protective layer, that is, only one side of the light-filter strip needs to be connected to the frame, the other side of the light-filter strip is fixed by pressing with the protective layer, which can reduce a distance between the first portion and the protective layer, thereby reducing a front-back distance of the frame, which means reducing a thickness of the frame. The second portion is located outside the protective layer and the first portion, the infrared lamp tubes correspond to a position of the light-filter strip in the front-back direction to ensure that the infrared light generated by the infrared lamp tubes can pass through the light-filter strip well. The circuit board corresponds to the position of the protective layer in the front-back direction, in other words, the circuit board is arranged at a back side of the infrared lamp tubes, and a structure at the position of a back side of the second portion can be used reasonably to fix the circuit board, so that it can further reduce an overall thickness of the second portion, thereby reducing the thickness of the frame. Further, the extending direction of the infrared lamp tubes is parallel to the protective layer to ensure that the infrared light can better cover the display panel assembly and achieve a better touch effect; at the same time, the distance between the axis of the infrared lamp tubes and the front side face of the protective layer can be reduced, so as to reduce a distance between a front-most side of a touch sensing region and the front side face of the protective layer. In other words, a height of the touch sensing region can be reduced, the possibility of false touch can be reduced, and the touch experience can be improved. In addition, since the extending direction of the infrared lamp tubes is parallel to the protective layer, that is, the infrared lamp tubes are arranged in a direction perpendicular to the front-back direction, the thickness of the second portion can be further reduced, thereby reducing the thickness of the frame, so as to achieve the effect of reducing the distance between the front side face of the frame and the front side face of the protective layer, so that a thickness of a space at the front side of the protective layer can be reduced, the appearance of the infrared touch display screen can be more beautiful, and the visual experience of the user can be improved.

BRIEF DESCRIPTION OF THE DRAWINGS

The present application can be better understood from the following description of specific embodiments of the present application in conjunction with the accompanying drawings. Herein, other features, objects and advantages of the present application will become more apparent upon reading the following detailed description of non-limiting embodiments with reference to the accompanying drawings, and the same or similar reference numerals refer to the same or similar features.

Figure 1:
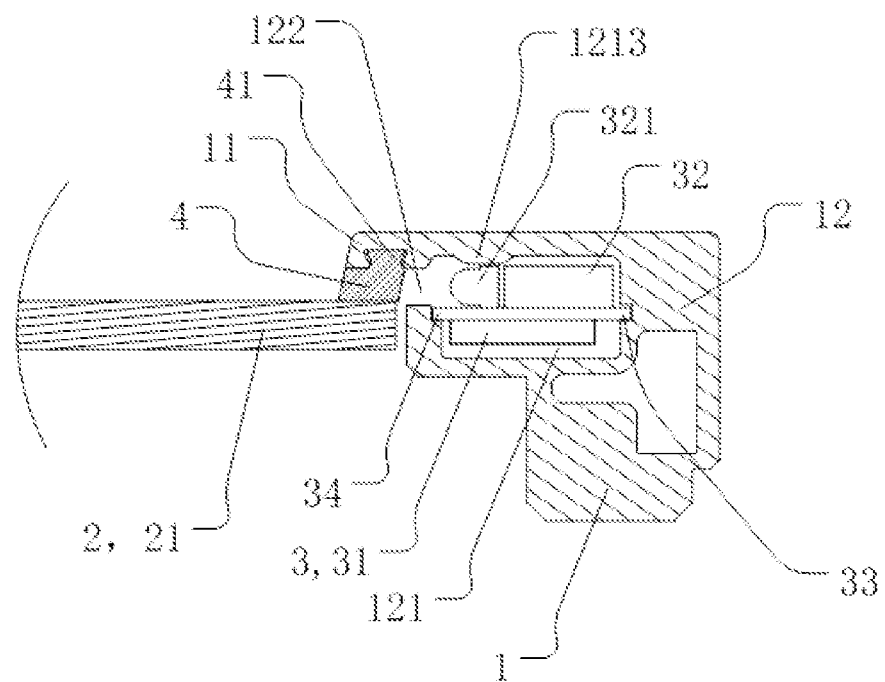
FIG. 1 shows a partial cross-sectional view of an infrared touch display screen provided by an optional embodiment of the present application.

DESCRIPTION OF REFERENCE NUMBERS 1. frame; 11. first portion; 111. first engaging groove; 12. second portion; 121, placement groove; 1211, first groove wall; 1212, second engaging groove; 1213, first position-limiting portion; 1214, second groove wall; 1215, second position-limiting portion; 122, light outlet; 2, display panel assembly; 21, protective layer; 3, circuit board assembly; 31, circuit board; 32, infrared lamp tube; 321, head portion; 33, second engaging portion; 34, third engaging portion; 4, light-filter strip; 41, first engaging portion; 5, corner structure.

DETAILED DESCRIPTION

Features and exemplary embodiments of various aspects of the present application are described in detail below. Numerous specific details are disclosed in the following detailed description to provide a thorough understanding of the present application. However, it is apparent to those skilled in the art that the present application may be practiced without some of these specific details. The following description of the embodiments is merely to provide a better understanding of the present application by illustrating examples of the present application. The present application is in no way limited to any specific configuration set forth below, but covers any modifications, substitutions and improvements of elements and components without departing from the gist of this application. In the drawings and the following description, well-known structures and techniques have not been shown in order to avoid unnecessarily obscuring the present application.

Figure 2:
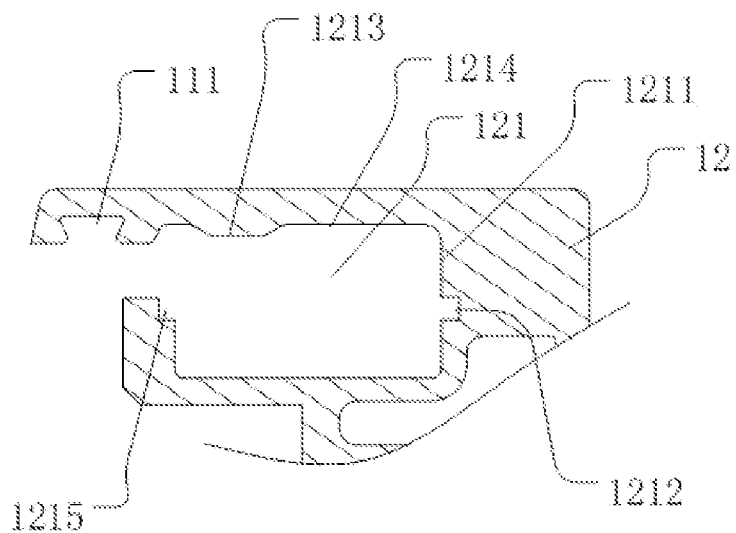
FIG. 2 shows a partial cross-sectional view of a frame of an infrared touch display screen provided by an optional embodiment of the present application.
Figure 3:
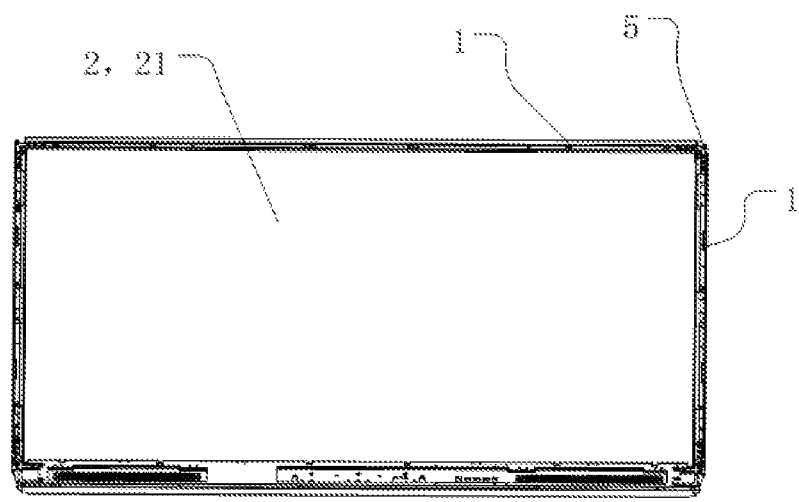
FIG. 3 shows an overall structure schematic view of an infrared touch display screen provided by an optional embodiment of the present application.

Referring to FIG. 1 to FIG. 3, an embodiment of the present application provides an infrared touch display screen, such as a multimedia interactive screen, the infrared touch display screen includes a frame 1, a display panel assembly 2, a light-filter strip 4 and a circuit board assembly 3.

The display panel assembly 2 includes a protective layer 21, and the protective layer 21 is, such as, tempered glass. The protective layer 21 is located at a front-most side of the display panel assembly 2, and is used to protect a display screen and other structures located at a back side of the protective layer, block dust from entering an interior of the display panel assembly 2, and ensure the normal use of the display panel assembly 2.

The circuit board assembly 3 includes a circuit board 31 and infrared lamp tubes 32 arranged on the circuit board 31, and the infrared lamp tubes 32 generate infrared light to meet the requirements of the infrared touch. The infrared lamp tubes 32 are located at a front side of the circuit board 31, and the protective layer 21 is located in a space enclosed by the frame 1.

The frame 1 includes a first portion 11 for mounting the light-filter strip 4 and a second portion 12 for mounting the circuit board assembly 3. The first portion 11 and the second portion 12 are of an integral structure, and the frame 1 can be optionally made of profiles to ensure the overall structural strength.

The first portion 11 is located at a front side of the protective layer 21, the light-filter strip 4 is located between the first portion 11 and the protective layer 21, a front side of the light-filter strip 4 is connected with the first portion 11, and a back side of the light-filter strip 4 abuts against the protective layer 21, that is, only one side of the light-filter strip 4 needs to be connected to the frame 1, the other side of the light-filter strip is fixed by pressing with the protective layer 21, which can reduce a distance between the first portion 11 and the protective layer 21, thereby reducing a front-back distance of the frame 1, which means reducing a thickness of the frame 1.

The second portion 12 is located outside the protective layer 21 and the first portion 11, the infrared lamp tubes 32 correspond to a position of the light-filter strip 4 in a front-back direction, so as to ensure that the infrared light generated by the infrared lamp tubes 32 can well pass through the light-filter strip 4. The circuit board 31 corresponds to a position of the protective layer 21 in the front-back direction, in other words, the circuit board 31 is arranged at the back side of the infrared lamp tubes 32, and a structure at the position of a back side of the second portion 12 can be used reasonably to fix the circuit board 31, so that it can further reduce an overall thickness of the second portion 12, thereby reducing the thickness of the frame 1.

Further, an extending direction of the infrared lamp tubes 32 is parallel to the protective layer 21 to ensure that the infrared light can better cover the display panel assembly 2 and achieve a better touch effect; at the same time, a distance between axes of the infrared lamp tubes 32 and a front side face of the protective layer 21 can be reduced, so as to reduce a distance between a front-most side of a touch sensing region and the front side face of the protective layer 21, that is, a height of the touch sensing region can be reduced, the possibility of false touch can be reduced, and the touch experience can be improved.

In addition, since the extending direction of the infrared lamp tubes 32 is parallel to the protective layer 21, that is, the infrared lamp tubes 32 are arranged in a direction perpendicular to the front-back direction, the thickness of the second portion 12 can be further reduced, thereby reducing the thickness of the frame 1, so as to achieve the effect of reducing the distance between a front side face of the frame 1 and the front side face of the protective layer 21, so that a thickness of a space at the front side of the protective layer 21 can be reduced, the appearance of the infrared touch display screen can be more beautiful, and the visual experience of the user can be improved.

Optionally, referring to FIG. 1 to FIG. 3, a distance between the axis of the infrared lamp tubes 32 and the front side face of the protective layer 21 is less than or equal to 1.5 mm, so as to further improve the accidental-touch-prevention performance and enhance the touch using experience. Further, a distance between the front side face of the frame 1 and the front side face of the protective layer 21 is less than or equal to 5.8 mm, which can further reduce the thickness of the frame 1, make the appearance of the infrared touch display screen more beautiful, and improve the visual experience of the user.

Further, referring to FIG. 1 to FIG. 3, the light-filter strip 4 and the first portion 11 can be connected by the adhesive connection, the snapping connection or a fastening member. Optionally, the front side of the light-filter strip 4 is snappingly connected to the first portion 11 to facilitate disassembling and mounting.

Further, the first portion 11 is provided with a first engaging groove 111. The first engaging groove 111 is formed by concaving a back side face of the first portion toward a direction of a front side face of the first portion 11. The light-filter strip 4 includes a first engaging portion 41 engaged with the first engaging groove 111. The light-filter strip 4 is connected with the first portion 11 through the first engaging portion 41 snapping into the first engaging groove 111. Herein, the specific shapes of the first engaging groove 111 and the first engaging portion 41 can be arbitrary, as long as the two shapes can be snappingly connected. For example, the first engaging groove may be a convex-shaped groove, and a cross-sectional area of a notch of the first engaging groove is smaller than a cross-sectional area of an interior of the first engaging groove, so as to ensure the reliability of the snapping connection. Alternatively, the first engaging groove may have a smaller notch and an elliptical structure inside, so as to prevent the first engaging portion 41 from sliding out freely from the notch and ensure the reliability of the snapping connection between the light-filter strip 4 and the first portion 11.

In an optional embodiment, a cross-section of the first engaging groove 111 is configured as a trapezoid, in which a size of a side of the trapezoid close to the display panel assembly 2 is smaller than a size of a side of the trapezoid away from the display panel assembly. A width of a free end of the first engaging portion 41 is smaller than a width of an opposite end, and the light-filter strip 4 is connected with the first portion 11 through the first engaging portion 41 snapping into the first engaging groove 111. The back side of the light-filter strip 4 is pressed against the protective layer 21 to ensure that the light-filter strip 4 is firmly fixed between the frame 1 and the protective layer 21.

In order to avoid scratches on the light-filter strip 4 when the light-filter strip 4 is connected to the first portion 11, and also to avoid injury to the mounting personnel, optionally, round-chamfer corners of the above-mentioned trapezoidal first engaging grooves 111 can be adopted to avoid sharp corners from scratching the mounting personnel or causing scratches to the light-filter strip 4.

Further, referring to FIG. 1 to FIG. 3, the second portion 12 is internally provided with a placement groove 121 for placing the circuit board assembly 3. The second portion 12 is also provided with a light outlet 122 for emitting infrared light. The light outlet 122 is located at an inward side of the placement groove 121 and communicated with the placement groove 121. The light-filter strip 4 is located at an inward side of the light outlet 122 and is arranged close to the light outlet 122, so as to ensure that the infrared light generated by the infrared lamp tubes 32 can pass through the light-filter strip 4 and then reach the display panel assembly 2. And the light outlet 122 is arranged at a position corresponding to the light-filter strip 4, which can also prevent the infrared light from being emitted from other positions, which may affect the visual experience of the user.

In addition, the light-filter strip 4 is arranged at the position of the light outlet 122, which can also prevent the dust from entering the placement groove 121, so as to prevent the dust from interfering with the circuit board assembly 3. At the same time, the light-filter strip 4 can also filter out the cluttered information, so as to prevent cluttered light from interfering with the infrared light, in which the cluttered light may affect the normal use of the infrared touch display screen.

Optionally, the placement groove 121 includes a first groove wall 1211 facing the light outlet 122, a second engaging groove 1212 for mounting the circuit board assembly 3 is arranged on the first groove wall 1211, a second engaging portion 33 engaged with the second engaging groove 1212 is arranged on the circuit board assembly 3, and the second engaging portion 33 is inserted into the second engaging groove 1212, so as to restrict the circuit board assembly 3 from moving in the front-back direction and the circuit board assembly 3 from moving toward an outer side.

Optionally, a second position-limiting portion 1215 is arranged at a side of the light outlet 122 of the placement groove 121. The second position-limiting portion 1215 includes a stepped structure. The stepped structure includes a first stepped face, a second stepped face and a connecting face for connecting the first stepped face and the second stepped face. The first stepped face is located at a front side of the second stepped face. The circuit board assembly 3 is provided with a third engaging portion 34 engaged with the stepped structure. The second stepped face is configured to restrict the third engaging portion 34 from moving toward a back side of the placement groove 121, and the connecting face is configured to restrict the third engaging portion 34 from moving toward an inner side of the placement groove 121. Due to the engagement of the second position-limiting portion 1215 and the second engaging groove 1212, the movement of the circuit board assembly 3 in an inner-outer direction can be restricted, the movement of the circuit board assembly 3 to the back side can be better restricted, and the movement of the circuit board assembly 3 to the front side can be restricted in a certain extent.

In addition, the reason why the stepped structure is provided instead of a same or a similar structure as the second engaging groove 1212 is to facilitate mounting the circuit board assembly 3. When mounting the circuit board assembly 3, firstly the second engaging portion 33 is mounted into the second engaging groove 1212, and then the third engaging portion 34 is placed at the stepped structure, so that it can ensure the reliable installation of the circuit board assembly 3, so that it can ensure the reliable mounting of the circuit board assembly 3 and improve the mounting efficiency.

Furthermore, a front side of the placement groove 121 includes a second groove wall 1214. A first position-limiting portion 1213 protruding toward a direction of the circuit board assembly 3 is arranged on the second groove wall 1214 to restrict the infrared lamp tubes 32 from moving forward. At the same time, when mounting the circuit board assembly 3, due to the existence of the first position-limiting portion 1213, it can also better ensure that the infrared lamp tubes 32 correspond to the position of the light-filter strip 4 in the front-back direction, and better ensure that the extending direction of the infrared lamp tubes 32 is parallel to the protective layer 21.

In addition, the first position-limiting portion 1213 restricts the infrared lamp tubes 32 from moving, thereby restricting the circuit board assembly 3 from moving forward. Due to the engaging of the first position-limiting portion 1213, the second position-limiting portion 1215 and the second engaging groove 1212, it can better restrict the circuit board assembly 3 moving in the front-back direction and the inner-outer direction, so that the circuit board assembly 3 can be more stably fixed in the placement groove 121 to ensure the normal use of the infrared touch display screen.

Further, referring to FIG. 1 to FIG. 3, a distance between a free end face of the first position-limiting portion 1213 and a front side face of the second portion 12 is equal to a distance between a back side face of the first portion 11 and a front side face of the first portion 11; in other words, the free end face of the first position-limiting portion 1213 is flush with the back side surface of the first portion 11 to better ensure that the position of the infrared lamp tubes 32 corresponds to the light-filter strip 4 in the front-back direction.

Optionally, the first position-limiting portion 1213 is located at a side of the second groove wall 1214 close to the light outlet 122, that is, the first position-limiting portion 1213 is located at a position of head portions 321 of the infrared lamp tubes 32, so that it can better ensure that the head portions 321 of the infrared lamp tubes 32 can be flush with the light-filter strip 4 in the front-back direction, so as to better ensure that the infrared light emitted by the infrared lamp tubes 32 can be emitted to an outer of the placement groove 121 through the light-filter strip 4 and can engage with the display panel assembly 2, thereby further improving the touch experience of the user.

Optionally, referring to FIG. 3, the infrared touch display screen further includes a corner structure 5. The corner structure 5 is located at a corner position of the frame 1 to strengthen the connection strength of the corner position of the frame 1, so that it can ensure that the frame 1 can better protect and fix the display panel assembly 2, ensure the normal use of the infrared touch display screen, prolong the service life of the infrared touch display screen and improve the using experience of the user.

Those skilled in the art should understand that the above-mentioned embodiments are all illustrative and not restrictive. Different technical features appearing in different embodiments can be combined to achieve beneficial effects. Those skilled in the art should be able to understand and implement other variant embodiments of the disclosed embodiments on the basis of studying the drawings, the description and the claims. In the claims, the term "comprising" does not exclude other means or steps; the articles are intended to include one/a or more of items when they are not qualified by a quantifier, and can be used interchangeably with "one/a or more of items"; the terms "first", "second" are used to designate names and not to indicate any particular order. Any reference signs in the claims shall not be construed as limiting the protective scope. The functions of several parts presented in the claims can be implemented by a single hardware or software module. The mere presence of certain technical features in different dependent claims does not imply that these features cannot be combined to obtain the beneficial effect.

What is claimed is:

1. An infrared touch display screen, comprising a frame, a display panel assembly, a light-filter strip and a circuit board assembly, wherein the display panel assembly comprises a protective layer, the circuit board assembly comprises a circuit board and infrared lamp tubes arranged on the circuit board; the infrared lamp tubes are located at a front side of the circuit board; the protective layer is located in a space enclosed by the frame, the frame comprises a first portion for mounting the light-filter strip and a second portion for mounting the circuit board assembly, the first portion is located at a front side of the protective layer, the second portion is located outside the protective layer and the first portion, the light-filter strip is located between the first portion and the protective layer, a front side of the light-filter strip is connected with the first portion, and a back side of the light-filter strip abuts against the protective layer; the circuit board corresponds to a position of the protective layer in a front-back direction, the infrared lamp tubes correspond to a position of the light-filter strip in the front-back direction, and an extending direction of the infrared lamp tubes is parallel to the protective layer;

wherein the second portion is internally provided with a placement groove for placing the circuit board assembly, and the second portion is also provided with a light outlet for emitting infrared light;

the placement groove comprises a first groove wall facing the light outlet, a second engaging groove for mounting the circuit board assembly is arranged on the first groove wall, a second engaging portion engaged with the second engaging groove is arranged on the circuit board assembly, and the second engaging portion is inserted into the second engaging groove.

2. The infrared touch display screen according to claim 1, wherein the first portion is provided with a first engaging groove; the first engaging groove is formed by concaving a back side face of the first portion toward a direction of a front side face of the first portion, a cross-section of the first engaging groove is configured as a trapezoid a size of a side of the trapezoid close to the display panel assembly is smaller than a size of a side of the trapezoid away from the display panel assembly, the light-filter strip comprises a first engaging portion engaged with the first engaging groove, a width of a free end of the first engaging portion is smaller than a width of an opposite end, and the light-filter strip is connected with the first portion through the first engaging portion snapping into the first engaging groove.

3. The infrared touch display screen according to claim 1, wherein the light outlet is located at an inward side of the placement groove and communicated with the placement groove, and the light-filter strip is located at an inward side of the light outlet and is arranged close to the light outlet.

4. The infrared touch display screen according to claim 1, wherein a front side of the placement groove comprises a second groove wall, and a first position-limiting portion protruding toward a direction of the circuit board assembly is arranged on the second groove wall to restrict the infrared lamp tubes from moving forward.

5. The infrared touch display screen according to claim 4, wherein a distance between a free end face of the first position-limiting portion and a front side face of the second portion is equal to a distance between a back side face of the first portion and a front side face of the first portion, and the first position-limiting portion is located at a position of head portions of the infrared lamp tubes.

6. The infrared touch display screen according to claim 1, wherein a second position-limiting portion is arranged at a side of the light outlet of the placement groove, the second position-limiting portion comprises a stepped structure, the stepped structure comprises a first stepped face, a second stepped face and a connecting face for connecting the first stepped face and the second stepped face, the first stepped face is located at a front side of the second stepped face, the circuit board assembly is provided with a third engaging portion engaged with the stepped structure, the second stepped face is configured to restrict the third engaging portion from moving toward a back side of the placement groove, and the connecting face is configured to restrict the third engaging portion from moving toward an inner side of the placement groove.

7. The infrared touch display screen according to claim 1, wherein a distance between an axis of the infrared lamp tubes and a front side face of the protective layer is less than or equal to 1.5 mm.

8. The infrared touch display screen according to claim 1, wherein a distance between a front side face of the frame and a front side face of the protective layer is less than or equal to 5.8 mm.

9. The infrared touch display screen according to claim 1, wherein the infrared touch display screen comprises a corner structure, and the corner structure is located at a corner position of the frame to strengthen the connection strength of the corner position of the frame.

10. An infrared touch display screen, comprising a frame, a display panel assembly, a light-filter strip and a circuit board assembly, wherein the display panel assembly comprises a protective layer, the circuit board assembly comprises a circuit board and infrared lamp tubes arranged on the circuit board; the infrared lamp tubes are located at a front side of the circuit board; the protective layer is located in a space enclosed by the frame, the frame comprises a first portion for mounting the light-filter strip and a second portion for mounting the circuit board assembly, the first portion is located at a front side of the protective layer, the second portion is located outside the protective layer and the first portion, the light-filter strip is located between the first portion and the protective layer, a front side of the light-filter strip is connected with the first portion, and a back side of the light-filter strip abuts against the protective layer; the circuit board corresponds to a position of the protective layer in a front-back direction, the infrared lamp tubes correspond to a position of the light-filter strip in the front-back direction, and an extending direction of the infrared lamp tubes is parallel to the protective layer;

wherein the second portion is internally provided with a placement groove for placing the circuit board assembly, and the second portion is also provided with a light outlet for emitting infrared light;

a front side of the placement groove comprises a second groove wall, and a first position-limiting portion protruding toward a direction of the circuit board assembly is arranged on the second groove wall to restrict the infrared lamp tubes from moving forward.

11. The infrared touch display screen according to claim 10, wherein the first portion is provided with a first engaging groove; the first engaging groove is formed by concaving a back side face of the first portion toward a direction of a front side face of the first portion, a cross-section of the first engaging groove is configured as a trapezoid a size of a side of the trapezoid close to the display panel assembly is smaller than a size of a side of the trapezoid away from the display panel assembly, the light-filter strip comprises a first engaging portion engaged with the first engaging groove, a width of a free end of the first engaging portion is smaller than a width of an opposite end, and the light-filter strip is connected with the first portion through the first engaging portion snapping into the first engaging groove.

12. The infrared touch display screen according to claim 10, wherein the light outlet is located at an inward side of the placement groove and communicated with the placement groove, and the light-filter strip is located at an inward side of the light outlet and is arranged close to the light outlet.

13. The infrared touch display screen according to claim 10, wherein the placement groove comprises a first groove wall facing the light outlet, a second engaging groove for mounting the circuit board assembly is arranged on the first groove wall, a second engaging portion engaged with the second engaging groove is arranged on the circuit board assembly, and the second engaging portion is inserted into the second engaging groove.

14. The infrared touch display screen according to claim 10, wherein a distance between a free end face of the first position-limiting portion and a front side face of the second portion is equal to a distance between a back side face of the first portion and a front side face of the first portion, and the first position-limiting portion is located at a position of head portions of the infrared lamp tubes.

15. The infrared touch display screen according to claim 10, wherein a second position-limiting portion is arranged at a side of the light outlet of the placement groove, the second position-limiting portion comprises a stepped structure, the stepped structure comprises a first stepped face, a second stepped face and a connecting face for connecting the first stepped face and the second stepped face, the first stepped face is located at a front side of the second stepped face, the circuit board assembly is provided with a third engaging portion engaged with the stepped structure, the second stepped face is configured to restrict the third engaging portion from moving toward a back side of the placement groove, and the connecting face is configured to restrict the third engaging portion from moving toward an inner side of the placement groove.

16. An infrared touch display screen, comprising a frame, a display panel assembly, a light-filter strip and a circuit board assembly, wherein the display panel assembly comprises a protective layer, the circuit board assembly comprises a circuit board and infrared lamp tubes arranged on the circuit board; the infrared lamp tubes are located at a front side of the circuit board; the protective layer is located in a space enclosed by the frame, the frame comprises a first portion for mounting the light-filter strip and a second portion for mounting the circuit board assembly, the first portion is located at a front side of the protective layer, the second portion is located outside the protective layer and the first portion, the light-filter strip is located between the first portion and the protective layer, a front side of the light-filter strip is connected with the first portion, and a back side of the light-filter strip abuts against the protective layer; the circuit board corresponds to a position of the protective layer in a front-back direction, the infrared lamp tubes correspond to a position of the light-filter strip in the front-back direction, and an extending direction of the infrared lamp tubes is parallel to the protective layer;
wherein the second portion is internally provided with a placement groove for placing the circuit board assembly, and the second portion is also provided with a light outlet for emitting infrared light;
a second position-limiting portion is arranged at a side of the light outlet of the placement groove, the second position-limiting portion comprises a stepped structure, the stepped structure comprises a first stepped face, a second stepped face and a connecting face for connecting the first stepped face and the second stepped face, the first stepped face is located at a front side of the second stepped face, the circuit board assembly is provided with a third engaging portion engaged with the stepped structure, the second stepped face is configured to restrict the third engaging portion from moving toward a back side of the placement groove, and the connecting face is configured to restrict the third engaging portion from moving toward an inner side of the placement groove.

17. The infrared touch display screen according to claim 16, wherein the first portion is provided with a first engaging groove; the first engaging groove is formed by concaving a back side face of the first portion toward a direction of a front side face of the first portion, a cross-section of the first engaging groove is configured as a trapezoid a size of a side of the trapezoid close to the display panel assembly is smaller than a size of a side of the trapezoid away from the display panel assembly, the light-filter strip comprises a first engaging portion engaged with the first engaging groove, a width of a free end of the first engaging portion is smaller than a width of an opposite end, and the light-filter strip is connected with the first portion through the first engaging portion snapping into the first engaging groove.

18. The infrared touch display screen according to claim 16, wherein the light outlet is located at an inward side of the placement groove and communicated with the placement groove, and the light-filter strip is located at an inward side of the light outlet and is arranged close to the light outlet.

19. The infrared touch display screen according to claim 16, wherein the placement groove comprises a first groove wall facing the light outlet, a second engaging groove for mounting the circuit board assembly is arranged on the first groove wall, a second engaging portion engaged with the second engaging groove is arranged on the circuit board assembly, and the second engaging portion is inserted into the second engaging groove.

20. The infrared touch display screen according to claim 16, wherein a front side of the placement groove comprises a second groove wall, and a first position-limiting portion protruding toward a direction of the circuit board assembly is arranged on the second groove wall to restrict the infrared lamp tubes from moving forward.

* * * * *